(12) United States Patent
Gendron

(10) Patent No.: US 6,910,618 B2
(45) Date of Patent: Jun. 28, 2005

(54) METHOD FOR PREPARING PIPE FOR BUTT WELDING

(75) Inventor: Kevin Gendron, The Woodlands, TX (US)

(73) Assignee: The Technologies Alliance, Inc., Houston, TX (US)

( * ) Notice: Subject to any disclaimer, the term of this patent is extended or adjusted under 35 U.S.C. 154(b) by 89 days.

(21) Appl. No.: 10/387,186

(22) Filed: Mar. 12, 2003

(65) Prior Publication Data

US 2003/0178472 A1 Sep. 25, 2003

Related U.S. Application Data

(60) Provisional application No. 60/366,290, filed on Mar. 21, 2002.

(51) Int. Cl.⁷ .................. B23K 31/02; B21D 39/00; B21D 41/00
(52) U.S. Cl. .................. 228/168; 228/165; 228/173.4; 72/58; 72/370.1
(58) Field of Search ................ 228/165, 168, 228/170, 173.4, 174; 285/222, 288.1, 382; 72/58, 68, 370.1, 370.13, 370.15

(56) References Cited

U.S. PATENT DOCUMENTS

| | | | |
|---|---|---|---|
| 1,945,080 A | * | 1/1934 | Thomas .................. 228/170 |
| 2,150,948 A | * | 3/1939 | Spatta .................... 74/607 |
| 3,495,854 A | | 2/1970 | Fether |
| 4,418,860 A | | 12/1983 | LaForce |
| 4,470,188 A | * | 9/1984 | Holbrook et al. .............. 29/445 |
| 4,509,777 A | | 4/1985 | Walker |
| 4,521,041 A | * | 6/1985 | Cox et al. .............. 285/133.21 |
| 4,625,537 A | * | 12/1986 | Aleck ...................... 72/370.15 |
| 4,645,247 A | * | 2/1987 | Ward ...................... 285/382.1 |
| 4,683,014 A | * | 7/1987 | Porowski et al. ........... 72/30.1 |
| 4,694,549 A | * | 9/1987 | Rabe ..................... 29/890.031 |
| 4,915,426 A | | 4/1990 | Skipper |
| 5,090,608 A | | 2/1992 | Jones |
| 5,240,168 A | * | 8/1993 | Lopez et al. ............... 228/168 |
| 5,286,069 A | | 2/1994 | Wilson |
| 5,380,048 A | * | 1/1995 | Vogel ......................... 285/22 |
| 5,730,472 A | * | 3/1998 | Krause et al. ............. 285/21.1 |
| 5,979,946 A | * | 11/1999 | Petersen et al. ............ 285/305 |
| 6,108,895 A | * | 8/2000 | Helsley, Jr. ................ 29/516 |
| RE37,167 E | | 5/2001 | Wilson |
| 6,434,990 B1 | * | 8/2002 | Juedes ......................... 72/61 |
| 6,495,268 B1 | * | 12/2002 | Harth, III .................. 428/586 |

\* cited by examiner

Primary Examiner—Lynne R. Edmondson
(74) Attorney, Agent, or Firm—Bracewell & Patterson, L.L.P.

(57) ABSTRACT

A steel pipe is welded to a threaded connector that has an end with a desired nominal inner diameter. A swage is forced over an end of the pipe, reducing an outer diameter and an initial inner diameter of the end of the pipe. A die is then forced into the end of the pipe, the die having an outer diameter sized to increase the inner diameter of the end of the pipe to the nominal inner diameter of the end of the connector. A weld groove is machined on the end of the pipe and the ends are abutted and welded at the weld grooves.

20 Claims, 3 Drawing Sheets

METHOD FOR PREPARING PIPE FOR BUTT WELDING

CROSS REFERENCE TO RELATED APPLICATION

This application claims priority to provisional application 60/366,290 filed Mar. 21, 2002.

FIELD OF THE INVENTION

This invention relates in general to preparing steel pipe for butt welding, particularly to a threaded connector.

BACKGROUND OF THE INVENTION

Subsea well production risers typically are made up of sections of pipe joined together with threaded connectors. In one type of production riser, the threaded connectors are formed separately and welded to the ends of pipe. These risers are subject to large bending forces due to wave motion, wind and currents. As a result, the risers are subject to severe fatigue and tensile loadings from the bending and weight of the riser string. Generally, the weakest point is at the weld.

One of the problems associated with welding the threaded connectors to the pipe is that often the pipe will not be precisely dimensioned at the weld. The pipe may be out of round or have an inner diameter that is too small or too large. The connector is a machined piece, thus its weld end is very accurate with respect to roundness and inner diameter. A typical tolerance might be plus or minus 0.010", although it could be smaller. It is very expensive to specify such high tolerances for pipe from a steel mill. For conventional API pipe, the inner diameter is governed by tolerances on the outer diameter and wall thickness, and is held to approximately plus or minus 2%. In special cases, mills have held inner diameter tolerances to about plus or minus 0.062" at a significant increase in cost.

Consequently, a mismatch at the inner diameters of the pipe and connector is likely to occur and result in inferior welds. This mismatch may lead to an early failure of the weld due to stress concentrations at the point of mismatch. Any mismatch on the exterior can be ground smooth, but a grinding operation in the inner diameter after welding would be expensive and time consuming.

In the prior art of machining threads directly on pipe ends, it is known to perform sizing operations on pipe ends prior to machining the threads. To applicant's knowledge, however, no one has performed sizing operations on a pipe end to achieve a tight tolerance inner diameter, then butt welding the pipe end to a threaded connector.

SUMMARY OF THE INVENTION

In this invention, the pipe is conventional and held only to the typical mill tolerances. The connector, being machined, will have an end that is within tolerances for roundness and inner diameter. To prepare the pipe, first an end portion is swaged to reduce an initial inner diameter of the end portion. Then, the inner diameter of the end portion is expanded to the desired nominal inner diameter. A weld groove is machined on the end portion.

Preferably, the end portion is heat treated after the expansion step to reduce residual stresses due to cold working. The swaging step is preferably performed by forcing a tubular swage over an outer diameter of the first tubular member. The expansion step is preferably performed by forcing a die into the inner diameter of the end portion.

DETAILED DESCRIPTION OF THE INVENTION

Figure 1:
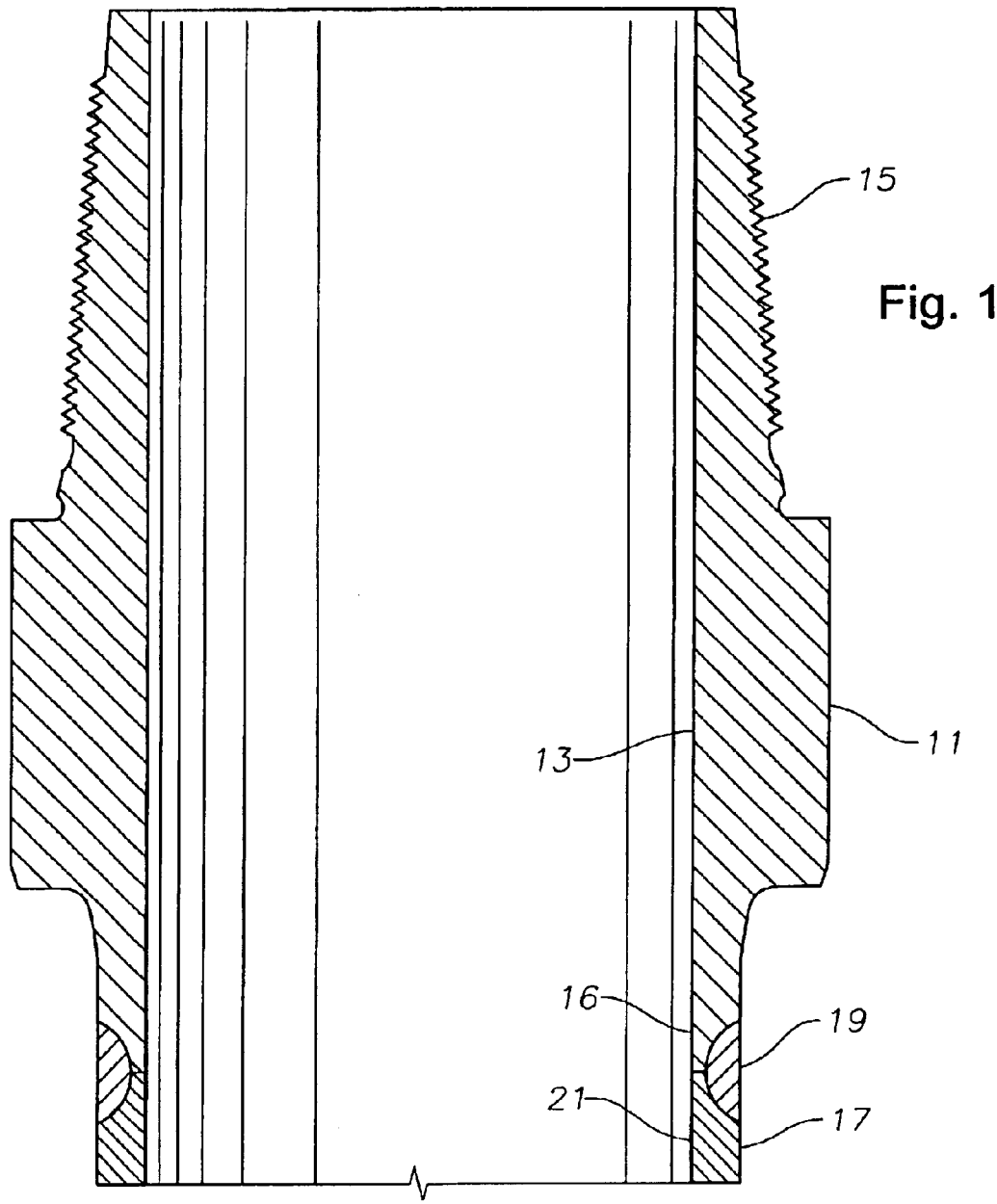
FIG. 1 is a sectional view of a pipe end and connector welded together in accordance with this invention.

Referring to FIG. 1, a threaded connector 11 is shown. Connector 11 is a tubular member preferably formed of steel and having a bore 13 through it. Connector 11 has threads 15 on one end that may be a variety of types. The opposite end 16 is joined to a steel pipe 17 by a weld 19. Typically, bore 13 will be formed with an inner diameter having a tolerance of plus or minus 0.010", although this could be smaller.

Figure 2:
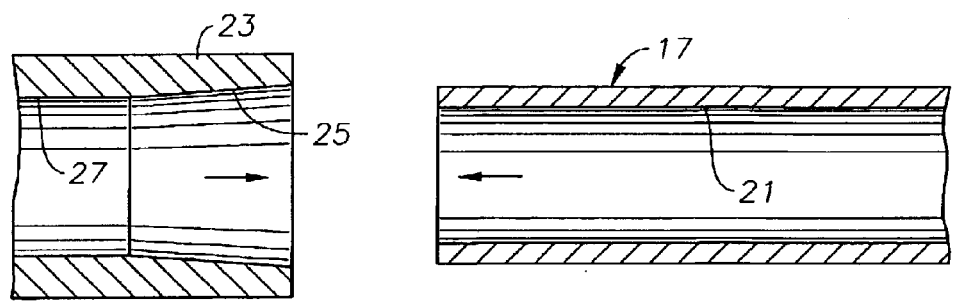
FIG. 2 is a schematic view illustrating the pipe end of FIG. 1 undergoing a preparatory step of swaging.

Referring to FIG. 1, connector 11 and pipe 17 are used to form sections of a production riser for subsea well production. Referring to FIG. 2, a few inches of the end of pipe 17, such as 4", are sized within desired tolerances to match the nominal inner diameter and roundness of the weld end 16 of connector 11. This sizing is performed in a cold working process by first swaging the end of pipe 17 with a swage die 23. Swage die 23 may be of any conventional type for swaging a tubular member to a smaller diameter. Swage die 23 may move over pipe 17 or vice-versa, or both members may move toward each other. Swage die 23 has a bore with a tapered entry 25 and an inner diameter 27 that is smaller than the nominal outer diameter of weld end 16 of connector 11.

Figure 3:
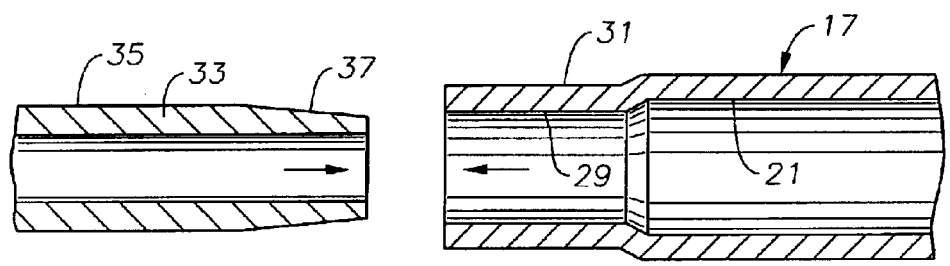
FIG. 3 is a schematic view of the pipe end of FIG. 2, after swaging, and shown undergoing a punching operation to enlarge the diameter of the swaged portion.

Inner diameter 27 is sized so that it will always be smaller than the outer diameter of pipe 17, even if the outer diameter is at its minimum tolerance. Consequently, swage die 23 will create a reduced inner diameter section 29 and a reduced outer diameter section 31 as it is brought over the end of pipe 17 illustrated in FIG. 3. The reduced diameter sections 29, 31 in FIG. 3 are shown greatly exaggerated for illustration purposes. The reduction in inner diameter 29 as a result of this swaging operation is from 1% to 5%, preferably about 3%. The dimension of reduced inner diameter section 29 will be less than the nominal inner diameter of connector end 16.

Next, reduced inner diameter section 29 undergoes a cold working enlargement with a die or punch 33 illustrated in FIG. 3. Punch 33 has an outer diameter 35 that is cylindrical and has a tapered section 37 on its forward end. The outer diameter 35 of punch 33 is the same as the nominal inner diameter of connector end 16 within a tolerance of preferably plus or minus 0.010" in the preferred embodiment, although it optionally could have a tolerance as much as 0.020". When punch 33 enters reduced inner diameter section 29, it will permanently deform the inner diameter section 29 to the nominal diameter of connector end 16. During the enlarging process, either punch 33 can be pushed into pipe 17, or vice versa, or both may be moved toward each other.

Figure 4:
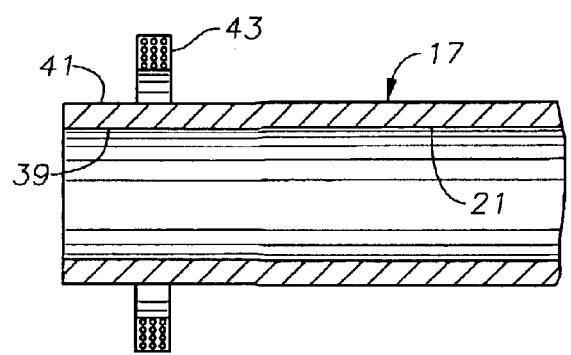
FIG. 4 is a schematic view of the pipe end of FIG. 2 after being enlarged by the punch operation of FIG. 3 and shown being heat-treated.

FIG. 4 shows nominal inner diameter section 39 after undergoing the enlargement procedure illustrated in FIG. 3. Inner diameter section 39 will now be within acceptable tolerances for roundness as well as inner diameter, these tolerances preferably being plus or minus 0.010" and as much as 0.020". The reduced outer diameter section 31 also enlarges while punch 33 enters inner diameter section 29 (FIG. 2). Outer diameter section 41 may not necessarily be the same as the outer diameter of connector end 16 (within plus or minus 0.010"), because the initial wall thickness of pipe 17 may have differed from the wall thickness of connector end 16 by a tolerance greater than 0.010". Any variations on the exterior may be ground off smooth after welding, however.

As illustrated in FIG. 4, preferably the end of pipe 17 is heat treated after nominal inner diameter section 39 has been achieved to remove residual stresses caused by the cold working of the processes shown in FIGS. 2 and 3. The amount of heat is not high enough to reach the lowest transformation temperature of the steel, rather it is maintained at a much lower level, such as 800° F. The heating may be applied by a variety of means, but is preferably handled by an induction coil 43 placed over inner diameter section 39 and outer diameter section 41. Preferably the cooling is by air.

Figure 5:
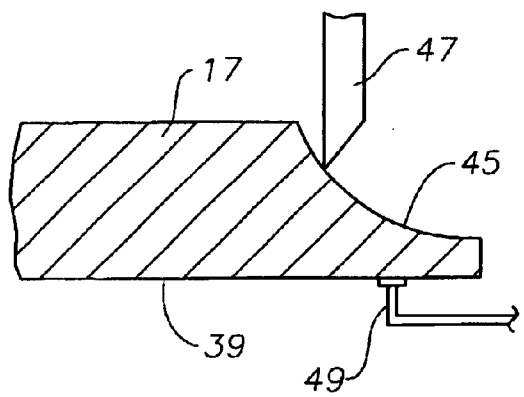
FIG. 5 is a schematic view of the pipe end of FIG. 2, illustrating a weld groove being machined.

Referring to FIG. 5, after heat treating, a weld groove 45 is formed on pipe 17. Weld groove 45 may be a variety of shapes and is generally a concave recess or bevel. A cutting tool 47 is used to form groove 45. A follower 49 connected with cutting tool 47 engages the nominal inner diameter section 39 during the machining process to assure that weld groove 45 is concentric with nominal inner diameter section 39. Follower 49 controls the position of cutting tool 47. Machine tools having followers such as follower 49 and a cutting tool 47 are conventional.

Figure 6:
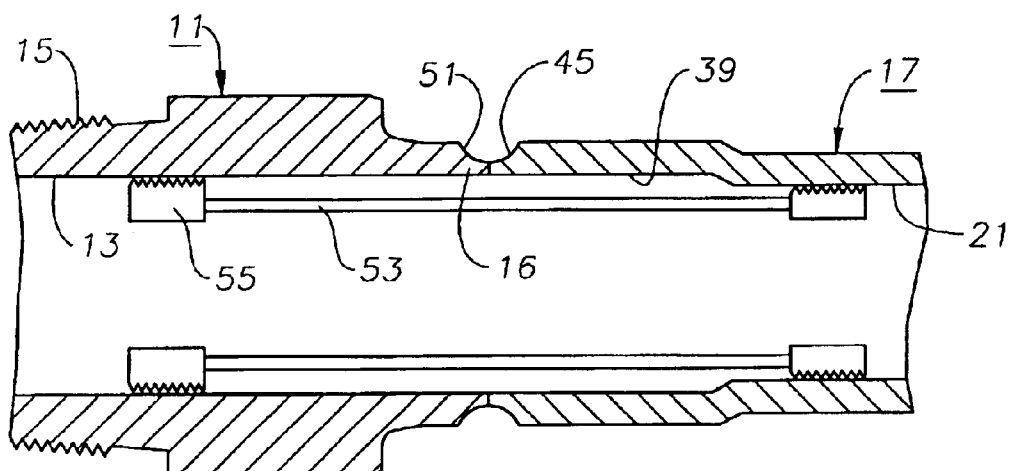
FIG. 6 is a schematic of the pipe end of FIG. 2, shown abutted with the connector of FIG. 1 for welding.

Then, connector 11 is abutted against pipe 17 as illustrated in FIG. 6. The inner diameter 13 of connector end 16 will have been previously machined to be at the nominal dimension within tolerances. Because of the swaging and enlarging processes of FIGS. 2 and 3, nominal inner diameter section 39 will be at the same dimension within tolerances. Weld groove 51 on connector 11 will mate with weld groove 45. A fixture 53 of conventional design has gripping members 55 that grip bores 13 and 21 to align and hold connector 11 in abutment with pipe 17. The welding may be of a variety of types such as TIG, submerged arc or MIG. After the welding is completed, preferably the outer diameter 41 of pipe end 17 is ground flush with the outer diameter of connector end 16.

The invention has significant advantages. The method results in a better weld because the inner diameters will match within tolerances. Conventional mill pipe may be employed without increasing tolerances. The steps of swaging, enlarging and heat treating can be performed with conventional equipment.

While the sizing and welding operations described above are in connection with securing a connector to a pipe, this could also be performed when connecting two pipes together where the pipes will be undergoing severe bending and fatigue stresses. In the example above, the outer diameter of pipe 17 is 10¾" but diameters could range from about 9⅝" to 16" for offshore production risers of this nature.

While the invention has been shown in only one of its forms, it should be apparent to those skilled in the art that it is not so limited but is susceptible to various changes without departing from the scope of the invention.

I claim:

1. A method for joining a tubular member to a threaded riser connector, comprising:
    (a) swaging an end portion of the tubular member to reduce an initial inner diameter of the end portion;
    (b) after the inner diameter has been reduced, expanding the inner diameter of the end portion to a desired nominal inner diameter that matches a nominal inner diameter of the threaded riser connector within a selected tolerance;
    (c) machining a weld groove on the end portion; and
    (d) abutting the end portion of the tubular member to an end portion of the threaded connector, and welding the end portions to each other.

2. The method according to claim 1, wherein step (a) is performed by forcing a tubular swage over an outer diameter of the tubular member.

3. The method according to claim 1, wherein step (b) is performed by forcing a die into the inner diameter of the end portion of the tubular member.

4. The method according to claim 1, wherein step (c) is performed after step (b).

5. The method according to claim 1, further comprising heat treating the end portion of the tubular member after step (b) to reduce internal stresses.

6. The method according to claim 1, further comprising heat treating the end portion of the tubular member after step (b) and before step (c) at a temperature below a lowest transformation temperature of the material of the tubular member.

7. The method according to claim 1, wherein step (b) results in a reduction of the initial inner diameter in the range from 1% to 5%.

8. The method according to claim 1, wherein steps (a) and (b) are performed by cold working processes.

9. The method according to claim 1, wherein the selected tolerance of step (b) is within plus or minus 0.020 inch.

10. The method according to claim 1, wherein the selected tolerance of step (b) is within plus or minus 0.010 inch.

11. A method for welding a tubular member to a threaded connector that has an end with a desired nominal inner diameter and a weld groove, comprising:
    (a) swaging an end of the tubular member to reduce an initial inner diameter of the end of the tubular member to less than the nominal inner diameter of the end of the threaded connector; then
    (b) forcing a die into the end of the tubular member to increase the inner diameter of the end of the tubular member to the nominal inner diameter of the end of the threaded connector within a tolerance of plus or minus 0.020 inch; then
    (c) machining a weld groove on the end of the tubular member; then
    (d) abutting the end of the tubular member to the end of the threaded connector and welding the ends together at the weld grooves.

12. The method according to claim 11, wherein step (a) is performed by forcing a tubular swage over an outer diameter of the tubular member.

13. The method according to claim 11, further comprising heat treating the end of the tubular member after step (b) and before step (c) at a temperature below a lowest transformation temperature of the material of the tubular member.

14. The method according to claim 11, wherein step (b) results in a reduction of the initial inner diameter in the range from 1% to 5%.

15. The method according to claim 11, wherein steps (a) and (b) are performed by cold working processes.

16. A method for welding a steel pipe to a threaded connector that has an end with a desired nominal inner diameter and a weld groove, comprising:
   (a) forcing a swage over an end of the pipe, reducing an outer diameter and an initial inner diameter of the end of the pipe, the swage being dimensioned to provide the end of the pipe with an inner diameter that is less than the nominal inner diameter of the end of the connector; then
   (b) forcing a die into the end of the pipe, the die having an outer diameter sized to increase the inner diameter of the end of the pipe to the nominal inner diameter of the end of the connector; then
   (d) heat treating the end of the pipe to at a temperature less than a lowest transformation temperature of the pipe; then
   (c) machining a weld groove on the end of the pipe; then
   (d) abutting the ends of the pipe and the connector and welding the ends together at the weld grooves.

17. The method according to claim 16, wherein step (b) results in a reduction of the initial inner diameter in the range from 1% to 5%.

18. The method according to claim 16, wherein steps (a) and (b) are performed by cold working processes.

19. The method according to claim 16, wherein the inner diameter of the end of the pipe is increased in step (b) to within plus or minus 0.020 inch of the nominal inner diameter of the end of the connector.

20. The method according to claim 1, wherein the inner diameter of the end of the pipe is increased in step (b) to within plus or minus 0.010 inch of the nominal inner diameter of the end of the connector.

* * * * *